(12) United States Patent
Artigas Monroy et al.

(10) Patent No.: US 10,071,666 B2
(45) Date of Patent: Sep. 11, 2018

(54) ADJUSTABLE FOOTREST

(71) Applicant: GM GLOBAL TECHNOLOGY OPERATIONS LLC, Detroit, MI (US)

(72) Inventors: Ernesto Artigas Monroy, Toluca (MX); Ernesto Hernandez Aviles, Ciudad (MX); Jose Sebastian Quijano Martinez, Ciudad (MX)

( * ) Notice: Subject to any disclaimer, the term of this patent is extended or adjusted under 35 U.S.C. 154(b) by 123 days.

(21) Appl. No.: 15/281,399

(22) Filed: Sep. 30, 2016

(65) Prior Publication Data

US 2018/0093600 A1 Apr. 5, 2018

(51) Int. Cl.
*B60N 3/06* (2006.01)

(52) U.S. Cl.
CPC .................................... *B60N 3/063* (2013.01)

(58) Field of Classification Search
CPC .................................. B60N 3/063; B60N 3/06
USPC ........................................................... 296/75
See application file for complete search history.

(56) References Cited

U.S. PATENT DOCUMENTS

| | | | | |
|---|---|---|---|---|
| 7,712,816 B2* | 5/2010 | Ujimoto | ................. | B62D 21/15 296/75 |
| 9,878,650 B2* | 1/2018 | Reed | ........................ | B60N 3/06 |
| 2002/0096904 A1* | 7/2002 | Matsushita | ............... | B60N 3/06 296/75 |
| 2003/0127882 A1* | 7/2003 | Sauvonnet | ............. | B60N 3/063 296/75 |
| 2008/0246300 A1* | 10/2008 | Portelance | ............... | B62J 25/00 296/75 |
| 2010/0230990 A1* | 9/2010 | Shukuri | .................. | B60N 3/066 296/75 |
| 2013/0220168 A1* | 8/2013 | Volke | ................... | A47C 16/025 105/342 |
| 2014/0210227 A1* | 7/2014 | Meszaros | ................. | B60N 3/06 296/75 |

* cited by examiner

*Primary Examiner* — Pinel E Romain

(57) ABSTRACT

An adjustable footrest for an occupant of a vehicle is presented herein. The footrest includes a footpad, footplate, and width adjustment element. The footpad extends from the foot well of the vehicle and is configured for engagement by a foot. The footplate is movably mounted to the footpad. The width adjustment element is configured to enable regulated adjustment of the footplate along the width of the footpad. The adjustable footrest may further include a support trackway configured to define telescopic adjustment of the footplate along the width of the footpad. The footpad may include a pivotable side flap and the footplate may include a flange configured to operatively connect with the side flap. The side flap can pivot towards and away from the footpad body as the footplate is adjusted along the width of the footpad.

20 Claims, 3 Drawing Sheets

ADJUSTABLE FOOTREST

INTRODUCTION

Fixed-position footrests are generally not readily adjustable to different height and width positions to accommodate vehicle occupants of different sizes and allow them to change foot positions. As a result, these occupants tend to avoid using the footrests during long journeys and end up being uncomfortable due to cramping and tiring in their legs. It would therefore be desirable to have a footrest which could readily be adjusted to different heights and widths to allow for more comfortable vehicle travel.

SUMMARY

An adjustable footrest for an occupant of a vehicle is presented herein. The footrest includes a footpad, footplate, and width adjustment element. The footpad extends from the foot well of the vehicle and is configured for engagement by a foot. The footplate is movably mounted to the footpad. The width adjustment element is configured to enable regulated adjustment of the footplate along the width of the footpad.

The adjustable footrest may further include a support trackway configured to define telescopic adjustment of the footplate along the width of the footpad. The footpad may include a pivotable side flap and the footplate may include a flange configured to operatively connect with the side flap. The side flap can pivot towards and away from the footpad body as the footplate is adjusted along the width of the footpad. The floorboard may be covered with carpeting and the footpad extends through a carpet cutout to enable movement of the footplate. The adjustable footrest may be configured for engagement by the left foot of a vehicle operator. The adjustable footrest may be configured for engagement by the foot of a vehicle passenger. The vehicle may be an automobile.

In one instance, the footplate may include a key. The width adjustment element may be a trackway along the width of the footpad, the trackway has teeth. Moreover, the key interlocks with the trackway teeth to enable regulated adjustment of the footplate along the width of the footpad. In this instance, a plurality of springs, configured to be situated within the support trackway, may be included to help hold the key in the interlocked position with the trackway teeth. In another instance, the footplate may include a rack. In such an instance, the width adjustment element is a motor with a pinion is inserted into the footpad. The pinion moreover corresponds with the rack to enable regulated adjustment of the footplate along the width of the footpad.

Another version of the adjustable footrest for an occupant of a vehicle is presented herein. The footrest includes a footpad and footplate. The footpad extends from the foot well of the vehicle and is configured for engagement by a foot. The footpad also comprises a plurality of ridges at select locations along the height of the footpad body. The footplate is movably mounted to the footpad and has a pivotable hinge. Moreover, the footplate is configured to pivot so as to operatively connect with each ridge to enable inclination adjustment of the footplate along the height of the footpad. The adjustable footrest may further include an inclination support trackway within the footpad body, the inclination support trackway being configured to further define the inclination adjustment of the footplate along the height of the footpad.

A method of adjusting the footrest for an occupant of a vehicle is also presented herein. The method includes: providing a footpad extending from the foot well of the vehicle, the footpad configured for engagement by a foot; providing a footplate movably mounted to the footpad, the footplate comprising a key; providing a first trackway along the width of the footpad, the first trackway comprising teeth, wherein the footpad key interlocks with the trackway teeth to enable regulated adjustment of the footplate along the first trackway; providing a second trackway along the width of the footpad and substantially parallel to the first trackway, the second trackway configured to define telescopic adjustment of the footplate along the first trackway; providing a plurality of springs configured to be situated within the second trackway, the springs further configured to substantially hold the key in the interlocked position with the trackway teeth; and adjusting the footplate from a first position to a second position along the first trackway as follows—moving the footplate along the height of the footpad body such that the key is shifted away from the trackway teeth and unlocks therefrom; moving the footplate along the width of the footpad body to the second position, wherein each spring is compressed, moving the footplate along the height of the footpad body at the second position such that the key shifts toward the trackway teeth and interlocks therewith; and holding the footplate at the second position by allowing each spring to apply force against the key while in the interlocked position.

DETAILED DESCRIPTION

Embodiments of the present disclosure are described herein. It is to be understood, however, that the disclosed embodiments are merely examples and other embodiments can take various and alternative forms. The figures are not necessarily to scale; some features could be exaggerated or minimized to show details of particular components. Therefore, specific structural and functional details disclosed herein are not to be interpreted as limiting, but merely as a representative basis for teaching one skilled in the art to variously employ the present system and/or method. As those of ordinary skill in the art will understand, various features illustrated and described with reference to any one of the figures can be combined with features illustrated in one or more other figures to produce embodiments that are not explicitly illustrated or described. The combinations of features illustrated provide representative embodiments for typical applications. Various combinations and modifications of the features consistent with the teachings of this disclosure, however, could be desired for particular applications or implementations.

Figure 1:
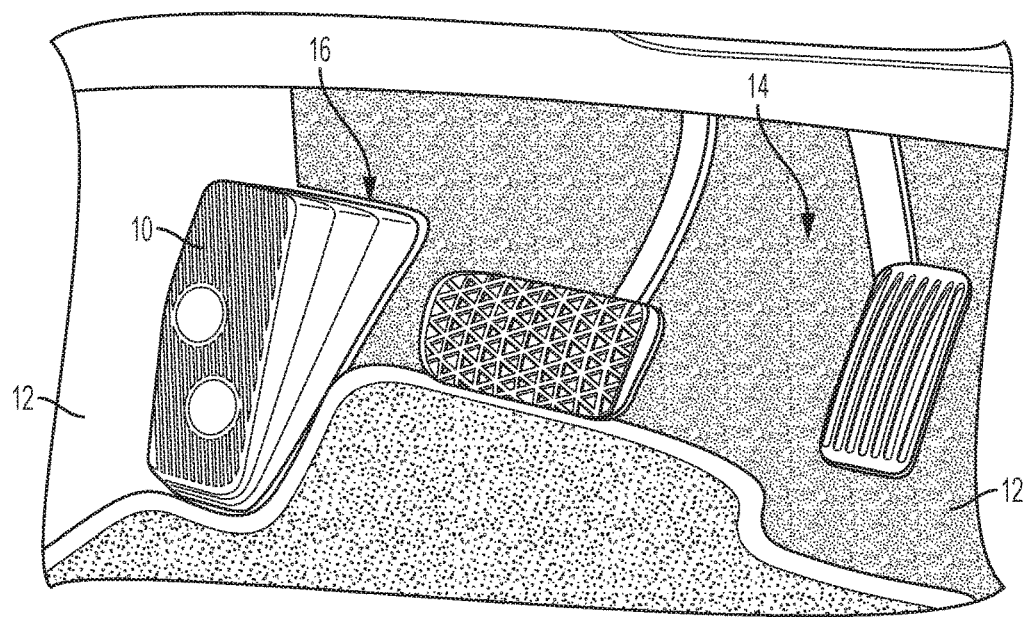
FIG. 1 shows an environment in which an adjustable footrest may be implemented.

With reference to FIG. 1, an adjustable footrest 10 can be seen to extend at an angular orientation from the floorboard 12 of the carpeted foot well 14 in an automobile. As shown, footrest 10 is located on the left side of well 14, which will allow the operator (i.e., driver) to engage their left foot (not shown) upon footrest 10 for comfort purposes. As shown, in this embodiment, floorboard 12 is completely covered with carpeting, except for a carpet cutout 16 in which footrest 10 extends out of to allow for movement of the footplate (discussed below). It has been envisioned that footrest 10 may be located in vehicles other than automobiles, such as, but not limited to, trucks, sports utility vehicles (SUVs), recreational vehicles (RVs), marine vessels (e.g., boats) and aircraft. It should also be understood that footrest 10 may be located in an a passenger foot well 14' of an automobile (or other vehicle) to allow a passenger to engage either foot (depending upon the side of the foot well 14 in which footrest 10 is located).

Figure 2:
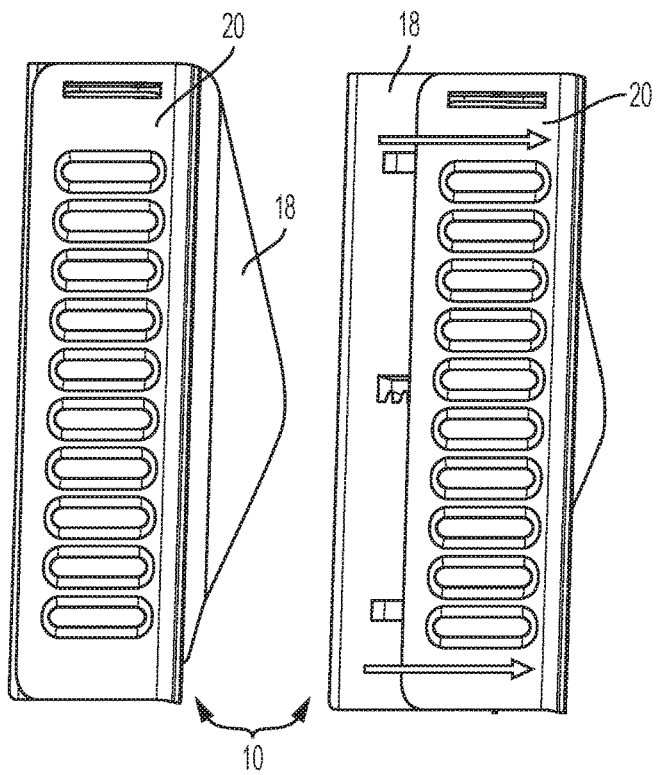
FIG. 2 shows an aspect of an embodiment of the adjustable footrest.
Figure 3:
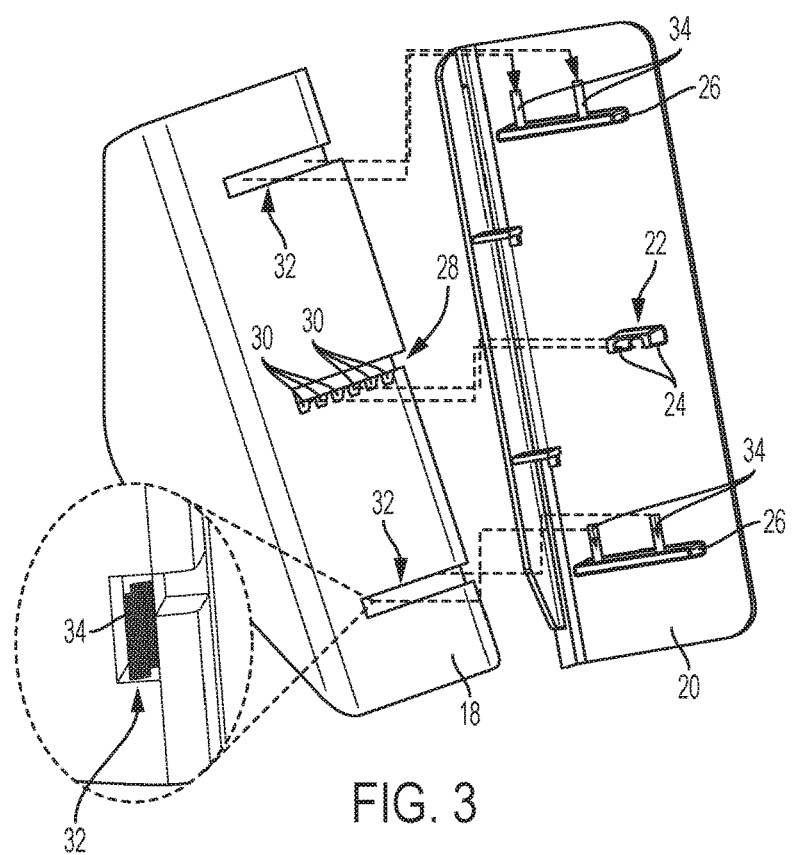
FIG. 3 shows another aspect of the adjustable footrest of FIG. 2.

As shown in FIGS. 2 and 3, footrest 10 incorporates a footpad 18 and a footplate 20 mounted to and covering footpad 18. The footpad 18 is the footrest component that extends from floorboard 12. Moreover, footplate 20 is movable over footpad 18 and can be adjusted to accommodate for a footrest width and inclination fitting the needs of the operator.

In this embodiment, footplate 20 includes a centrally located key 22 on the side which operatively presses against footpad 18. Key 22 has two ridges 24 and can be welded or molded onto footplate 20, depending on whether footplate 20 has been manufactured from metallic, elastomeric, or plastic material. Footplate 20 further includes two support ridges 26 that are in a parallel orientation with each other and peripherally located on each side of key 22 (and may be manufactured from the same material).

Footpad 18 includes a width adjustment element 28 defined as a trackway with multiple teeth, which spans the width of the footpad 18. One end of trackway 28 extends out one side of footpad 18 and the other completes in the footpad body 18. As such, key 22 can be inserted into trackway 28, such that the key ridges 24 can interlock with the trackway teeth 30. Moreover, as key 22 is moved along trackway 28, discussed further below, footplate 20 can be adjusted telescopically along the width of footpad 18.

In parallel with trackway 28 and in proximity of the footpad ends, are two support trackways 32. These trackways 32 may support footplate 20 to maintain its position on footpad 18 as well as ensure the footplate 20 moves in a defined telescopic manner from a first position to a selected, second position along the width of footpad 18. Each trackway may have an L-shaped cross section in which two springs 34 can be installed. The springs may moreover apply force against corresponding sides of support ridges 26, causing the footplate 20 rest in a preset position when installed to cover footpad 18. Through the body of footplate 20, such spring force can also indirectly hold key ridges 24 against trackway teeth 30, to help standardize the regulated interaction between key 22 and trackway 28.

To customize foot rest 10, by adjusting footplate 20 from a first position to a second position along trackway 28 (as can be understood with reference to FIG. 2), the vehicle operator will press unto and shift footplate 20 away from its resting, default position. This will cause footplate 20 to move up along the angular foot pad 18 and allow key 22 unlock within trackway 28, by shifting ridges 24 away from teeth 30. Next, while in a non-default position, the operator will move footplate 20 in a telescopic manner along the width of footpad 18, until a second position is reached.

While footplate 20 is being moved in this telescopic manner, the springs 34 should be compressed to alleviate assertion of any spring force against footplate 20. Once the second position has been reached, the operator should simply let go of footpad 18. This will allow the springs 34 to return to their default position and cause key 22 to interlock within trackway 28, by shifting ridges 24 toward and against teeth 30. The applied spring force thus ensures key 22 remains interlocked within trackway 28 until an operator desires adjusting footplate 20 and restarts this process.

Figure 4:
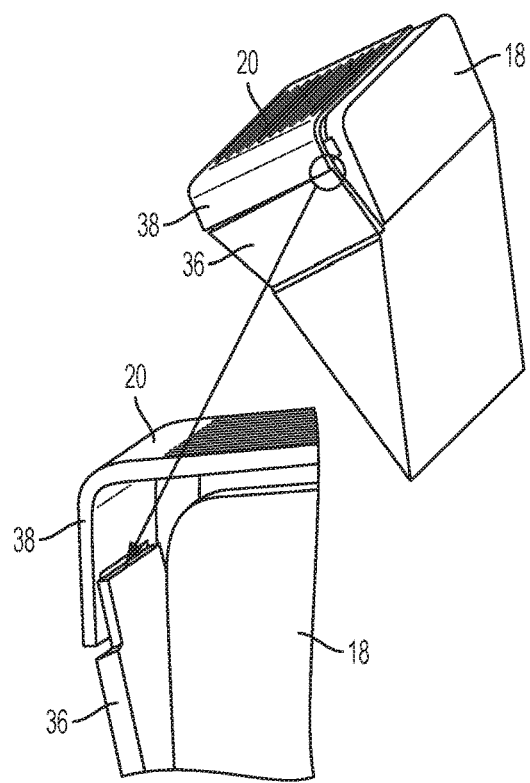
FIG. 4 shows another aspect of the adjustable footrest of FIG. 2.

As shown in FIG. 4, a pivotable flap 36 that may be connected to one side of footpad 18 via, for example, a living hinge or butt hinge. Correspondingly, projecting from one side of footplate 20 is a flange 38 that has a beveled section in which flap 36 operatively connects (e.g., via adhesives, a hinge mechanism, a pin, a living hinge, a welding process, etc.). As such, when footplate 20 is adjusted from a first position to a selected, second position along the width of footpad 18, flap 36 will move away from the side of footpad 18. Conversely, when footplate 20 is returned back to the first position, flap 36 will move towards the side of footpad 18.

Figure 5:
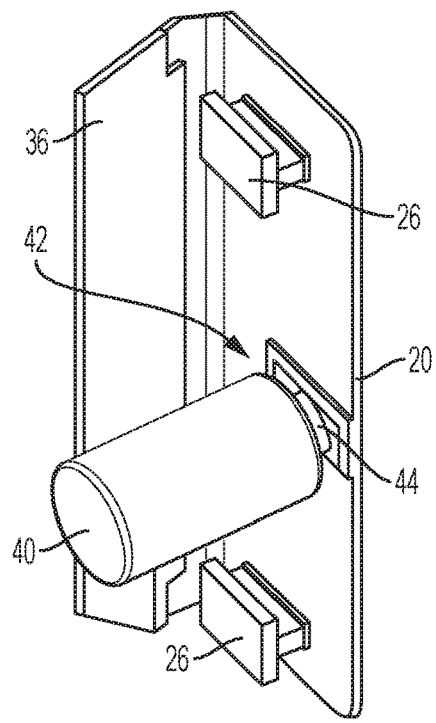
FIG. 5 shows an aspect of another embodiment of the adjustable footrest.

As shown in FIG. 5, another embodiment of footrest 10 may incorporate a motor 40 to enable the telescopic and regulated adjustment of the footplate along the width of footpad 18. In this embodiment, footplate 20 has a rack 42 on the side of the plate which operatively presses against footpad 18. Rack 42 may moreover be welded or molded onto footplate 20, depending on the method of footplate 20 manufacture. Motor 40 may be inserted into a cavity located within the body of footpad 18 and may include a pinion 44 that is designed to correspond with rack 42. Motor 40 may also be operated from a switch located elsewhere in the vehicle. As such, when operated, motor 40 rotates pinion 44 and causes automatic telescopic adjustment of footplate 20 along the width of footpad 18. It should be noted that, in this embodiment, each support ridge 26 may have a T-shaped cross section, which locks into the corresponding footpad support trackways 32. Constructing support ridges 26 in this manner helps ensure pinion 44 does not get derailed from rack 42.

Figure 6:
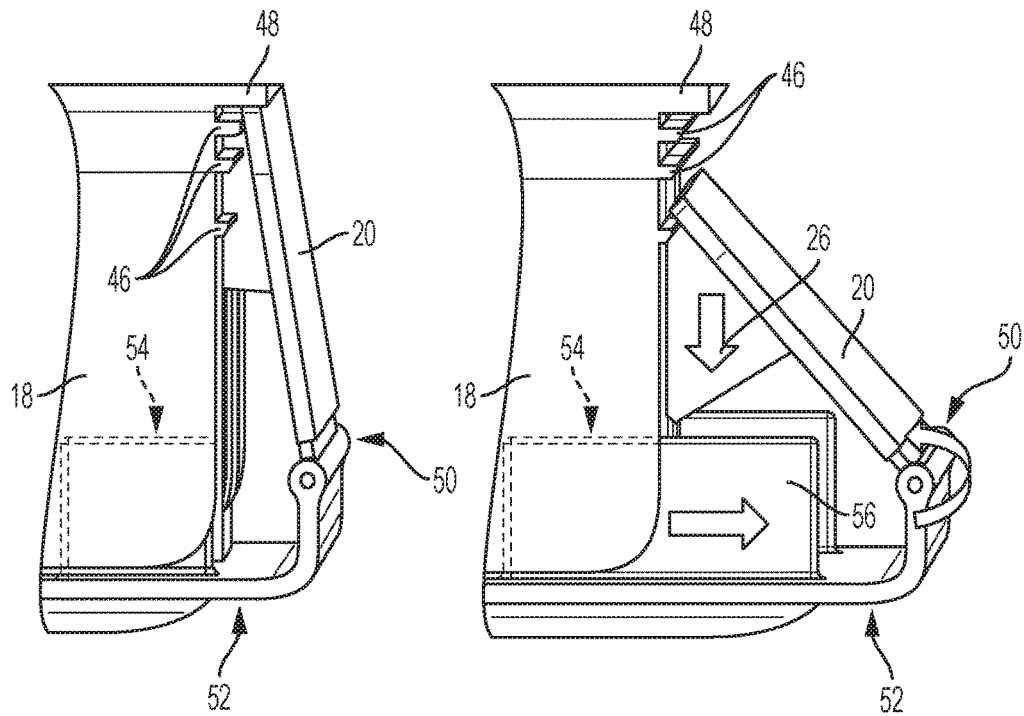
FIG. 6 shows an aspect of another embodiment of the adjustable footrest.

As shown in FIG. 6, another embodiment of footrest 10 may allow for inclination adjustment of footplate 20. In this embodiment, footpad 18 includes a number of inclination ridges 46, each at select locations along the height of the footpad 18, and an inclination stop 48. In this embodiment, moreover, footplate 20 incorporates a pivotable hinge 50 (e.g., a butt hinge) near its telescoping base 52. As such, when base 52 is moved away from footpad 18, footplate 20 can pivot to connect with each inclination ridge 46 until meeting with inclination stop 48. A number of internal inclination support trackways 54 run lengthwise within footpad 18. Support trackways 54 are designed to allow a support ridge 26 on the backside of footplate 20 as well as two additional parallel support ridges 56 on the backside of base 52 to slide telescopically within footpad 18. Such movement further helps footpad 18 to adjust to each inclined position along the height of the footpad 18 in a defined manner.

While exemplary embodiments are described above, it is not intended that these embodiments describe all possible forms encompassed by the claims. The words used in the specification are words of description rather than limitation, and it is understood that various changes can be made without departing from the spirit and scope of the disclosure. As previously described, the features of various embodiments can be combined to form further embodiments of the system and/or method that may not be explicitly described or illustrated. While various embodiments could have been described as providing advantages or being preferred over other embodiments or prior art implementations with respect to one or more desired characteristics, those of ordinary skill in the art recognize that one or more features or characteristics can be compromised to achieve desired overall system attributes, which depend on the specific application and implementation. These attributes can include, but are not limited to cost, strength, durability, life cycle cost, marketability, appearance, packaging, size, serviceability, weight, manufacturability, ease of assembly, etc. As such, embodiments described as less desirable than other embodiments or prior art implementations with respect to one or more characteristics are not outside the scope of the disclosure and can be desirable for particular applications.

What is claimed is:

1. An adjustable footrest for an occupant of a vehicle, the footrest comprising:
   a footpad which extends from a foot well of the vehicle, the footpad configured for engagement by a foot;
   a footplate comprising a key, the footplate movably mounted to the footpad;
   a trackway along a width of the footpad, the trackway comprising teeth and being configured to enable regulated adjustment of the footplate along the width of the footpad, wherein the key interlocks with the trackway teeth to enable regulated adjustment of the footplate along the width of the footpad;
   a support trackway configured to define telescopic adjustment of the footplate along the width of the footpad; and
   one or more springs configured to be situated within the support trackway, the one or more springs further configured to help hold the key in an interlocked position with the trackway teeth.

2. The adjustable footrest of claim 1, further comprising a support trackway configured to define telescopic adjustment of the footplate along the width of the footpad.

3. The adjustable footrest of claim 1, wherein:
   the footplate comprises a rack;
   the width adjustment element is a motor inserted into the footpad, the motor comprising a pinion; and
   wherein the pinion corresponds with the rack to enable regulated adjustment of the footplate along the width of the footpad.

4. The adjustable footrest of claim 1, wherein:
   the footpad comprises a pivotable side flap;
   the footplate comprises a flange, the flange configured to operatively connect with the side flap; and
   wherein the side flap can pivot towards and away from a footpad body as the footplate is adjusted along the width of the footpad.

5. The adjustable footrest of claim 1, wherein the floorboard is covered with carpeting, and the footpad extends through a carpet cutout for movement of the footplate.

6. The adjustable footrest of claim 1, wherein the adjustable footrest is configured for engagement by a left foot of a vehicle operator.

7. The adjustable footrest of claim 1, wherein the adjustable footrest is configured for engagement by a foot of a vehicle passenger.

8. The adjustable footrest of claim 1, wherein the vehicle is an automobile.

9. An adjustable footrest for an occupant of a vehicle, the footrest comprising:
   a footpad which extends from a foot well of the vehicle, the footpad configured for engagement by a foot, the footpad comprises a plurality of ridges at select locations along the height of a footpad body;
   a footplate movably mounted to the footpad, the footplate comprises a pivotable hinge;
   wherein the footplate is configured to pivot so as to operatively connect with each ridge to enable inclination adjustment of the footplate along the height of the footpad; and
   an inclination support trackway within the footpad body, the inclination support trackway configured to further define inclination adjustment of the footplate along the height of the footpad.

10. The adjustable footrest of claim 9, wherein a floorboard is covered with carpeting, and the footpad extends through a carpet cutout for movement of the footplate.

11. The adjustable footrest of claim 9, wherein the adjustable footrest is configured for engagement by a left foot of a vehicle operator.

12. The adjustable footrest of claim 9, wherein the adjustable footrest is configured for engagement by the foot of a vehicle passenger.

13. The adjustable footrest of claim 9, wherein the vehicle is an automobile.

14. A method of adjusting the footrest for an occupant of a vehicle, the method comprising:
   providing a footpad extending from a foot well of the vehicle, the footpad configured for engagement by a foot;
   providing a footplate movably mounted to the footpad, the footplate comprising a key;
   providing a first trackway along the width of the footpad, the first trackway comprising teeth, wherein the footpad key interlocks with the trackway teeth to enable regulated adjustment of the footplate along the first trackway;
   providing a second trackway along the width of the footpad and substantially parallel to the first trackway, the second trackway configured to define telescopic adjustment of the footplate along the first trackway;
   providing a plurality of springs configured to be situated within the second trackway, the springs further configured to substantially hold the key in an interlocked position with the trackway teeth; and
   adjusting the footplate from a first position to a second position along the first trackway as follows:
      moving the footplate along the height of the footpad body such that the key is shifted away from the trackway teeth and unlocks therefrom;
      moving the footplate along the width of the footpad body to the second position, wherein each spring is compressed;
      moving the footplate along the height of the footpad body at the second position such that the key shifts toward the trackway teeth and interlocks therewith; and
      holding the footplate at the second position by allowing each spring to apply force against the key while in the interlocked position.

15. The method of claim 14, wherein a floorboard is covered with carpeting, and the footpad extends through a carpet cutout for movement of the footplate.

16. The method of claim 14, wherein the adjustable footrest is configured for engagement by a left foot of a vehicle operator.

17. The method of claim 14, wherein the vehicle is an automobile.

18. The adjustable footrest of claim 1, wherein the footplate is made of metallic material, elastomeric material, or plastic material.

19. The adjustable footrest of claim 9, wherein the footplate is made of metallic material, elastomeric material, or plastic material.

20. The method of claim 14, wherein the footplate is made of metallic material, elastomeric material, or plastic material.

* * * * *